(12) United States Patent
Yamaguchi et al.

(10) Patent No.: US 9,659,688 B2
(45) Date of Patent: May 23, 2017

(54) HARNESS PROTECTOR AND WIRE-HARNESS WIRING STRUCTURE

(75) Inventors: Atsuyoshi Yamaguchi, Kosai (JP); Kazuhiro Shoji, Kosai (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 13/810,793

(22) PCT Filed: Jul. 20, 2011

(86) PCT No.: PCT/JP2011/066478
§ 371 (c)(1),
(2), (4) Date: Jan. 17, 2013

(87) PCT Pub. No.: WO2012/011502
PCT Pub. Date: Jan. 26, 2012

(65) Prior Publication Data
US 2013/0118777 A1 May 16, 2013

(30) Foreign Application Priority Data
Jul. 22, 2010 (JP) ................ 2010-165249

(51) Int. Cl.
*H01B 17/06* (2006.01)
*B60R 16/02* (2006.01)

(52) U.S. Cl.
CPC ......... *H01B 17/06* (2013.01); *B60R 16/0215* (2013.01)

(58) Field of Classification Search
CPC ..... H01B 17/06; H02G 11/00; B60R 16/0215
(Continued)

(56) References Cited

U.S. PATENT DOCUMENTS 5,401,905 A * 3/1995 Lesser et al. ............... 174/99 R
6,376,768 B1 * 4/2002 Saito ................... B60R 16/0215
174/507

(Continued)

FOREIGN PATENT DOCUMENTS

CN 2938504 Y 8/2007
EP 0555687 A1 8/1993
(Continued)

OTHER PUBLICATIONS

International Search Report (PCT/ISA/210), dated Oct. 4, 2011, issued by the International Searching Authority in counterpart International Patent Application No. PCT/JP2011/066478.
(Continued)

*Primary Examiner* — Hoa C Nguyen
*Assistant Examiner* — Stanley Tso
(74) *Attorney, Agent, or Firm* — Sughrue Mion, PLLC

(57) ABSTRACT

Provided is a harness protector, wherein a wire harness can easily be formed into a planar shape (with an oblate cross section), and maintained in that state. The harness protector is provided with: a protector body further provided with a roughly tabular-shaped bottom-plate section onto which a wire harness is to be placed, and a holding plate section that is integrally formed on one side of the bottom-plate section in pivotable state, and crushes the wire harness into an oblate cross-section shape, along with the bottom-plate section; and tying bands that anchor the holding plate section onto the bottom-plate section, in a state of having the holding plate section crushing the wire harness into an oblate cross-section shape.

9 Claims, 12 Drawing Sheets

(58) Field of Classification Search
USPC .................................................. 174/72 A
See application file for complete search history.

(56) References Cited

U.S. PATENT DOCUMENTS

| | | | | |
|---|---|---|---|---|
| 6,464,181 | B2* | 10/2002 | Sakakura | F16L 3/23 24/16 PB |
| 7,118,410 | B2* | 10/2006 | Hatori | H01R 13/5833 439/501 |
| 7,301,101 | B2* | 11/2007 | Suzuki | 174/68.1 |
| 2001/0010349 | A1 | 8/2001 | Sakakura | |
| 2006/0219423 | A1* | 10/2006 | Suzuki | B60R 16/0215 174/72 A |
| 2011/0147078 | A1* | 6/2011 | Satou | B60R 16/0215 174/72 A |
| 2011/0162885 | A1* | 7/2011 | Yamaguchi | B60R 16/0215 174/72 A |

FOREIGN PATENT DOCUMENTS

| | | |
|---|---|---|
| JP | 6-66233 U | 9/1994 |
| JP | 9-58742 A | 3/1997 |
| JP | 9-250515 A | 9/1997 |
| JP | 10-248681 A | 9/1998 |
| JP | 11-346413 A | 12/1999 |
| JP | 2002-305823 A | 10/2002 |
| JP | 2010-47141 A | 3/2010 |
| JP | 2010-57323 A | 3/2010 |

OTHER PUBLICATIONS

Written Opinion (PCT/ISA/237), dated Oct. 4, 2011, issued by the International Searching Authority in counterpart International Patent Application No. PCT/JP2011/066478.

Office Action dated Jan. 13, 2014 issued by the Japanese Patent Office in counterpart Japanese Patent Application No. 2010-165249.

Chinese Office Action; Application No. 201180035887.2; Mar. 2, 2015.

Office Action dated Nov. 2, 2015, issued by the State Intellectual Property Office of P.R. China in counterpart Chinese Application No. 201180035887.2.

Communication dated Nov. 10, 2016, issued by the European Patent Office in counterpart European Application No. 11809672.6.

Office Action dated May 7, 2014, issued by the Japanese Patent Office in counterpart Japanese Application No. 2010-165249.

* cited by examiner

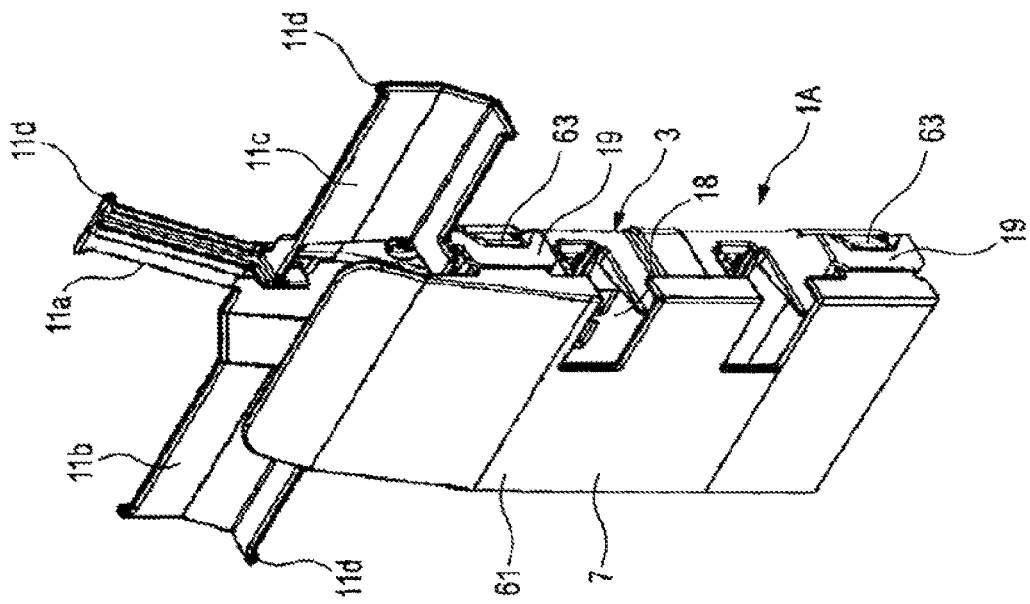
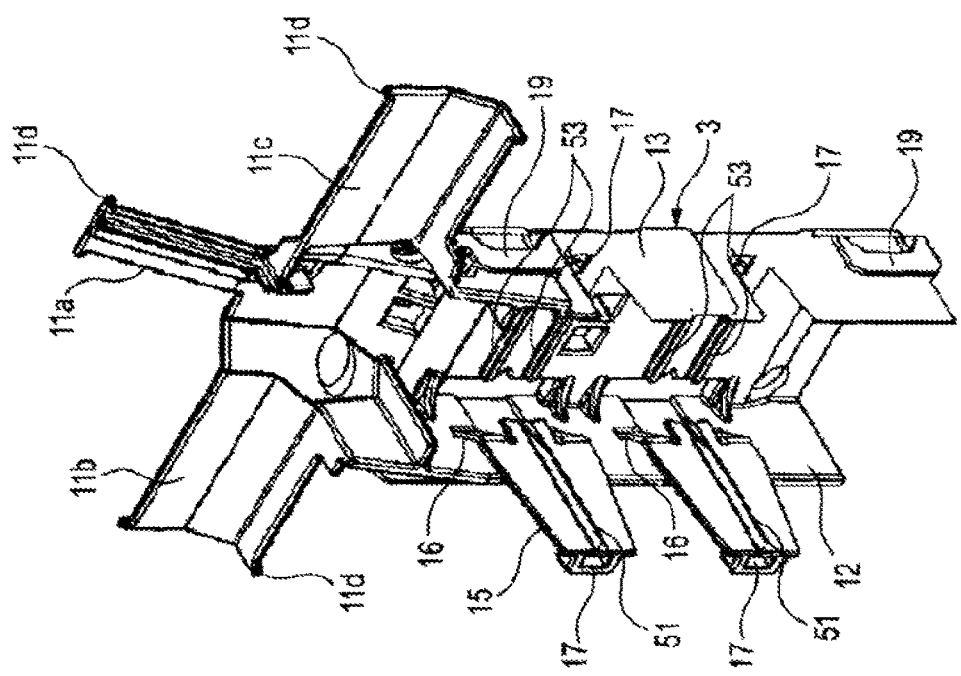

HARNESS PROTECTOR AND WIRE-HARNESS WIRING STRUCTURE

TECHNICAL FIELD

The invention relates to a harness protector that anchors a wire harness to a structure on a wire-harness wiring path in a vehicle and the like, and a wire-harness wiring structure using the harness protector.

BACKGROUND ART

FIGS. 9 to 12 show a conventional example of a band clamp for wire harness that anchors a wire harness to a structure on a wire-harness wiring path in a vehicle and the like.

As shown in FIG. 10, a wire harness 103 that is anchored to a structure by a band clamp 101 for wire harness has a configuration where an exterior material 105 covers an outer periphery of a bundle of a plurality of wires 104.

The band clamp 101 for wire harness has a placing plate section 111, a tying band section 121 that extends from one end of the placing plate section 111, a band engagement section 131 that extends from the other end of the placing plate section 111 and a clip section 141 (refer to FIG. 11) that protrudes from a backside of the placing plate section 111.

In the band clamp 101 for wire harness, the placing plate section 111, the tying band section 121 and the band engagement section 131 have the same configurations as a tying band disclosed in Patent Document 1. Also, the clip section 131 of the band clamp 101 for wire harness has the same structure as an anchor projection disclosed in Patent Document 2.

In the below, the structures of the placing plate section 111, the tying band section 121, the band engagement section 131 and the clip section 141 are more specifically described.

The placing plate section 111 is a part onto which the wire harness 103 is placed, and has a tabular shape.

The tying band section 121 extends in a direction (refer to an arrow A direction in FIG. 9) orthogonal to an axial line of the wire harness 103 from one end of the placing plate section 111 so that it can be wound onto an outer periphery of the wire harness 103 placed on the placing plate section 111. Also, one surface (an opposite surface to a side contacting the wire harness 103) of the tying band section 121 is formed with a plurality of engaging recesses 122 at a predetermined interval in the extension direction (refer to an arrow A direction in FIG. 9) of the tying band section 121.

The band engagement section 131 is integrally formed with the other end of the placing plate section 111. The band engagement section 131 has insertion-penetration holes 132 into which the tying band section 121 is inserted and latching claws 133 (refer to FIG. 11) that are formed in the insertion-penetration holes 132, are engaged with the engaging recesses 122 and restrain the tying band section 121 inserted into the insertion-penetration hole 132 from moving in a return direction, and is integrally formed at the other end of the placing plate section 111.

The clip section 141 is provided to protrude from the backside of the placing plate section 111 and is fitted into an attaching hole 152 of a structure 151 on a wiring path of the wire harness 103, thereby connecting the placing plate section 111 to the structure 151 (refer to FIG. 12). Meanwhile, in FIG. 9, the clip section 141 provided on the backside (the upper surface) of the placing plate section 111 is not shown.

An operating sequence of anchoring the wire harness 103 to the structure 151 by the band clamp 101 for wire harness is as follows.

First, as shown in FIG. 10, the wire harness 103 is placed on the placing plate section 111 of the band clamp 101 for wire harness and the tying band section 121 is then wound onto the outer periphery of the wire harness 103. Then, as shown in FIG. 11, a leading end of the tying band section 121 is inserted into the insertion-penetration hole 132. Then, as shown in FIG. 12, the leading end of the tying band section 121 is extended to anchor the wire harness 103 to the placing plate section 111 until the tying band section 121 firmly tightens the outer periphery of the wire harness 103. After that, the clip section 141 is fitted into the attaching hole 152 of the structure 151.

CITATION LIST

Patent Literature

[Patent Document 1] JP-A-9-58742
[Patent Document 2] JP-A-9-250515

SUMMARY OF INVENTION

Technical Problem

In recent years, as the number of electronic components to be mounted on a vehicle is increased, the number of the wires 104 to be accommodated in the wire harness 104 is also increased, so that the bundle tends to be enlarged. However, it is difficult to bend the wire harness having the enlarged diameter. Therefore, a bending radius of the wire harness becomes larger, so that a wide wiring space is required and a wiring operability is deteriorated.

Accordingly, in order to improve the wiring operability of the wire harness and to save the space of the wiring region in the vicinity of a part in which the wire harness is bent and arranged, it is necessary to form the wire harness 103 having a circular cross section into a planar shape (with an oblate cross section).

However, according to the band clamp 101 for wire harness, even when the tying band section 121 is tightened, it is not possible to exhibit an operation of crushing the wire harness 103 in one direction. Therefore, it is not possible to form the wire harness 103 into a planar shape (with an oblate cross section).

Also, according to the band clamp 101 for wire harness, a surface of the placing plate section 111 or tying band section 121 contacting the wire harness 103 is planar, so that the wire harness 103 is apt to slip. Therefore, the force of restraining the axial movement of the wire harness 103 is weak. Thus, for example, for a configuration where the wire harness is arranged between two structures over a moveable connection section that moveably connects the two structures, when axial load is applied to the wire harness 103 by relative movement of the two structures, the wire harness 103 is positionally deviated in the axial direction, so that a hindrance may be caused as regards the relative movement between the structures.

Therefore, the invention has been made to solve the above problems. An object of the invention is to provide a harness protector capable of easily forming a wire harness into a planar shape (with an oblate cross section) and maintaining the same in that state, improving a wiring operability of the wire harness and saving a space of a wiring region, and to provide a wire-harness wiring structure suitable for a wire harness that is arranged over a moveable connection section.

Solution to Problem

The above object of the invention is realized by following configurations.

(1) A harness protector comprising:

a protector body comprising a substantially tabular-shaped bottom-plate section on which a wire harness is placed and a substantially tabular-shaped holding plate section that is integrally and rotatably formed on one side of the bottom-plate section and crushes the wire harness into an oblate cross-section shape with the wire harness being interposed between the holding plate section and the bottom-plate section, and a tying band adapted to anchor the holding plate section onto the bottom-plate section in a state where the holding plate section crushes the wire harness into the oblate cross-section shape.

(2) In the harness protector described in the above (1), the protector body comprises a pair of side-plate sections that is provided to stand at both sides of the bottom-plate section, and the holding plate section is integrally and rotatably formed with one of the pair of side-plate sections, the harness protector further comprises a protector cover that is detachably engaged with the protector body and covers an opening section of the protector body.

(3) In the harness protector described in the above (1) or (2), the holding plate section is provided with a first movement restraint projection that breaks into a contacting surface of the wire harness to thus restrain axial movement of the wire harness.

(4) In the harness protector described in one of the above (1) to (3), the bottom-plate section is provided with a second movement restraint projection that breaks into a contacting surface of the wire harness to thus restrain axial movement of the wire harness.

(5) In the harness protector in one of the above (1) to (4), the harness protector further comprises an anchoring section that protrudes from an outer surface of the protector body and is fitted into an attaching hole of a structure on a wiring path of the wire harness, thereby connecting the protector body to the structure.

(6) A wire-harness wiring structure that arranges a wire harness between two structures over a moveable connection section moveably connecting the two structures, wherein the harness protector described in one of the above (1) to (5) is used as a means for anchoring the wire harness to the structures in the vicinity of the moveable connection section.

According to the above (1) configuration, since the wire harness to be maintained is anchored with being interposed and crushed between the substantially tabular-shaped bottom-plate section and the holding plate section, it is possible to easily form and maintain the wire harness into the planar shape (with an oblate cross section). In the vicinity of the anchored part by the harness protector, as the wire harness is made to be planar, it is possible to easily bend the wire harness with a small bending radius. Therefore, it is possible to improve the wiring operability of the wire harness and to save the space of the wiring region.

According to the above (2) configuration, the protector body has a U-shaped cross section by the bottom-plate section and the pair of side-plate sections at both sides of the bottom-plate section. When the wire harness is placed on the bottom-plate section, the pair of side-plate sections at both sides of the bottom-plate section restrains movement of the wire harness in a width direction. Therefore, it is possible to easily anchor the wire harness to the harness protector, thereby improving the wiring operability.

Also, the protector cover that covers the opening section of the protector body is provided. Therefore, it is possible to suppress the wire harness from being exposed on the harness protector, thereby improving the protective effect on the wire harness.

According to the above (3) configuration, at the state where the wire harness is held by the holding plate section and the bottom-plate section, the first movement restraint projection provided to the holding plate section breaks into the surface of the wire harness, thereby restraining the axial movement of the wire harness.

Therefore, compared to the conventional band clamp in which a surface contacting the wire harness is planar, it is possible to anchor the wire harness more firmly. Hence, the invention can be also appropriately applied to anchor the wire harness at a place where axial load is applied to the wire harness.

According to the above (4) configuration, at the state where the wire harness is held by the holding plate section and the bottom-plate section, the second movement restraint projection provided to the bottom-plate section breaks into the surface of the wire harness, thereby restraining the axial movement of the wire harness.

Therefore, compared to the conventional band clamp in which a surface contacting the wire harness is planar, it is possible to anchor the wire harness more firmly. Hence, the invention can be also appropriately applied to anchor the wire harness at a place where the axial load is applied to the wire harness.

According to the above (5) configuration, the anchoring section that protrudes from the outer surface of the protector body is fitted into the attaching hole of the structure on the wiring path of the wire harness. Thereby, it is possible to easily connect the protector body to the structure.

According to the above (6) configuration, the wire harness extending over the moveable connection section is made to be planar by the harness protector that is anchored to the structure in the vicinity of the wire harness. Therefore, it is possible to easily bend the wire harness with a small bending radius, so that it is possible to save a space of the wiring region of the wire harness and to improve the wiring operability in the vicinity of the moveable connection section. Thus, the wire-harness wiring structure that is appropriate for the wire harness to be arranged over the moveable connection section is obtained.

BRIEF DESCRIPTION OF THE DRAWINGS

FIG. 8A is a perspective view of a protector body according to a second embodiment of a harness protector of the invention and FIG. 8B is a perspective view showing a state where a protector cover is attached to the protector body shown in FIG. 8A.

DESCRIPTION OF EMBODIMENTS

Figure 1A:
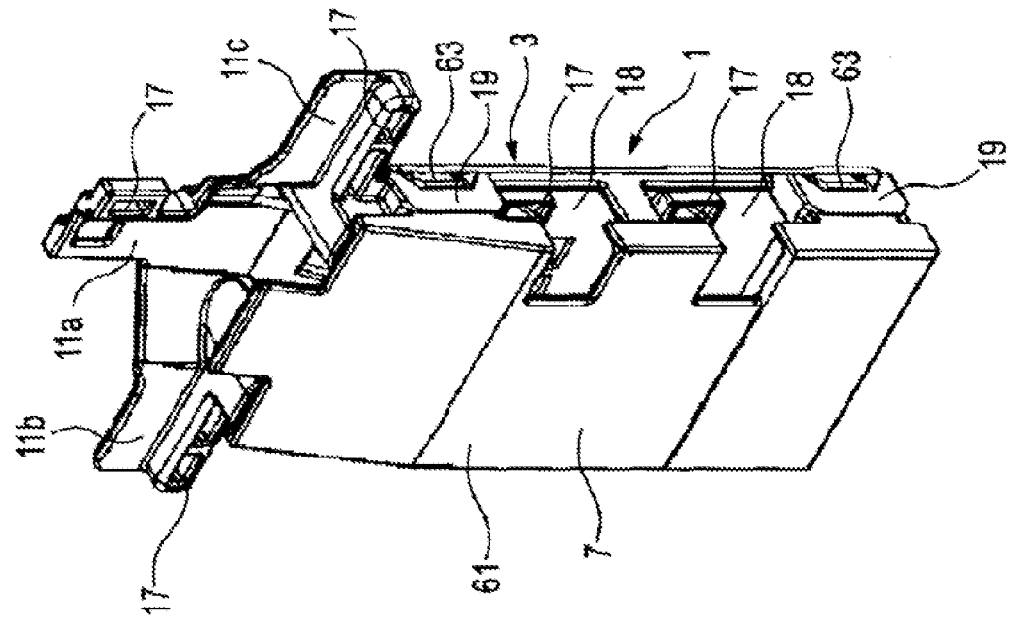
FIG. 1A is a perspective view of a protector body according to a first embodiment of a harness protector of the invention and FIG. 1B is a perspective view showing a state where a protector cover is attached to the protector body shown in FIG. 1A.

Hereinafter, preferred embodiments of the harness protector of the invention will be specifically described with reference to the drawings.

First Embodiment

FIGS. 1A to 5C show a first embodiment of the harness protector of the invention.

A harness protector 1 of the first embodiment has a protector body 3, tying bands 5 (refer to FIGS. 5A to 5C) and a protector cover 7. The protector body 3, the tying bands 5 and the protector cover 7 are resin-molded.

As shown in FIGS. 1A to 5C, the protector body 3 has a substantially tubular-shaped bottom-plate section 11 onto which a wire harness 9 is placed and a pair of side-plate sections 12, 13 that is provided to stand at both sides of the bottom-plate section 11, and a cross-section shape thereof is a U shape. Also, the protector body 3 has substantially tubular-shaped holding plate sections 15 that are integrally formed rotatably on one side of the bottom-plate section 11.

In this embodiment, the holding plate sections 15 are provided at two positions separated in a longitudinal direction of the wire harness 9. Also, the holding plate sections 15 are rotatably mounted through thin hinge sections 16 that are formed in the vicinity of a standing base section of one side-plate section 12 positioned at one side of the bottom-plate section 11. A rotating direction of the holding plate section 15 by the thin hinge section 16 is an arrow X1 direction of FIG. 1A.

The holding plate sections 15 are rotated toward the bottom-plate section 11 to thus interpose the wire harness 9 between the holding plate sections 15 and the bottom-plate section 11 and to crush the wire harness 9 into an oblate cross section, thereby making the wire harness 9 planar. The state where the wire harness 9 is crushed to have the oblate cross section by the holding plate sections 15 is maintained by the tying bands 5 that are wound onto the protector body 3 so as to tighten the outer peripheries of the holding plate sections 15. The tying bands 5 will be described below.

Figure 1B:
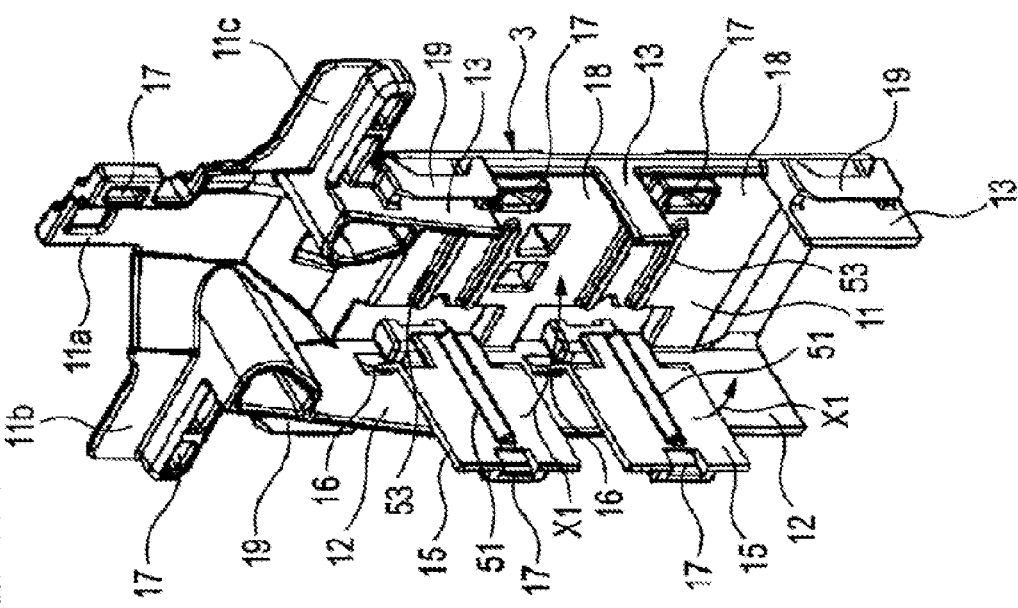
Figure 2:
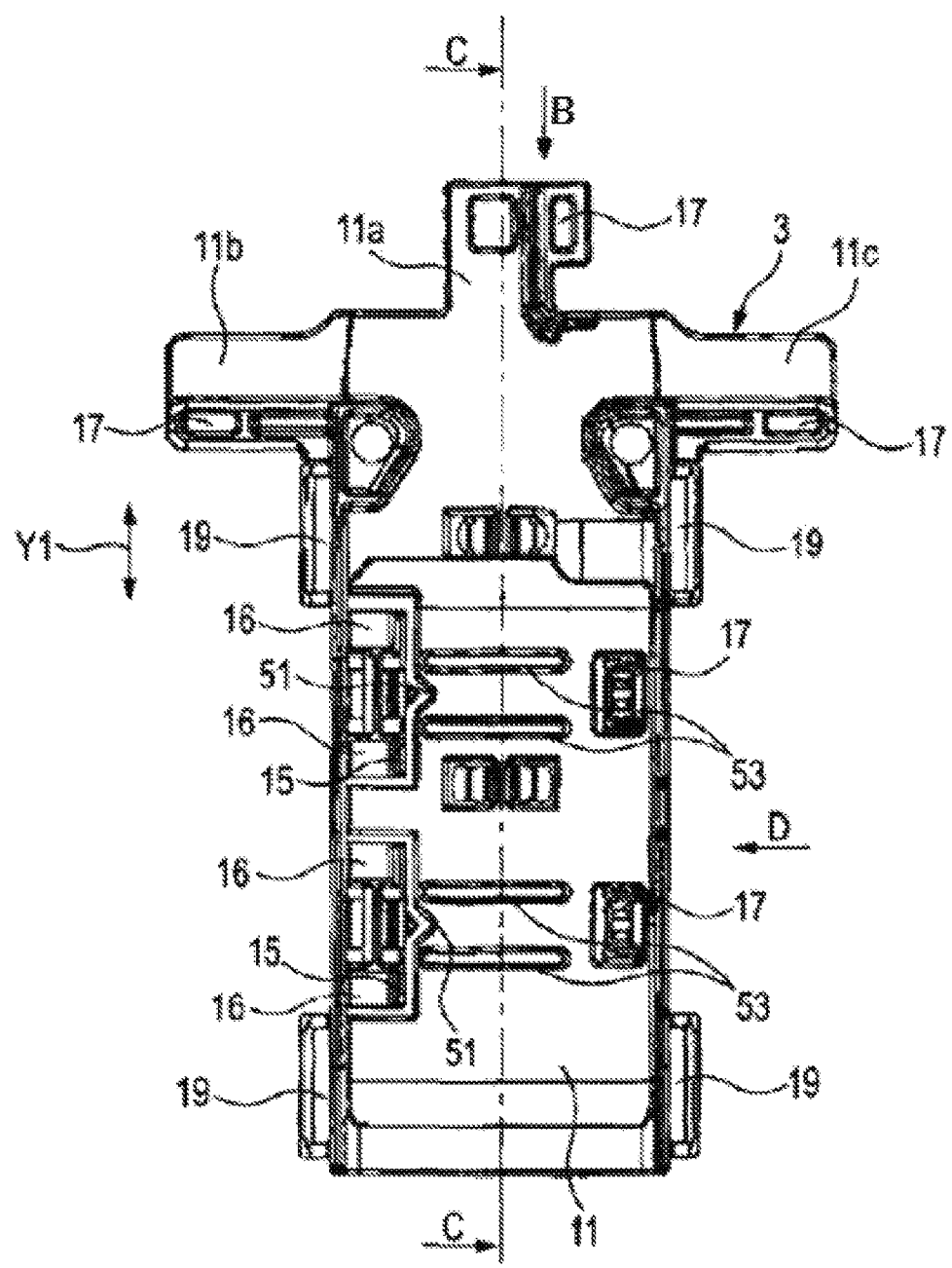
FIG. 2 is a plan view of the protector body shown in FIG. 1.

In this embodiment, as shown in FIGS. 1A to 2, each of the holding plate sections 15 with which the wire harness 9 is brought into contact is provided with a first movement restraint projection 51 that breaks into a contacting surface of the wire harness 9 to thus restrain axial movement of the wire harness 9. In this embodiment, the first movement restraint projection 51 is a rib that extends in a direction orthogonal to the axial direction of the wire harness 9. However, the first movement restraint projection may consist of a plurality of conical projections.

Also, in this embodiment, the bottom-plate section 11 is provided thereon with second movement restraint projections 53 that break into the contacting surface of the wire harness 9 to thus restrain the axial movement of the wire harness 9. The second movement restraint projections 53 are ribs that extend in the direction orthogonal to the axial direction of the wire harness 9 and are provided in four rows at an interval in the axial direction of the wire harness 9.

In this embodiment, the holding plate section 15 and the bottom-plate section 11 are formed with band insertion-penetration holes 17 for inserting the tying bands 5.

Also, in this embodiment, as shown in FIGS. 1A to 2, one end of the bottom-plate section 11 in the longitudinal direction is provided with a first extension section 11a that extends along an insertion-penetration direction (an arrow Y1 direction in FIG. 2) of a mainline of the wire harness 9 and a second extension section 11b and a third extension section 11c that extend in both-side directions of the first extension section 11a so as to be orthogonal to the insertion-penetration direction of the mainline of the wire harness 9.

Figure 5A:
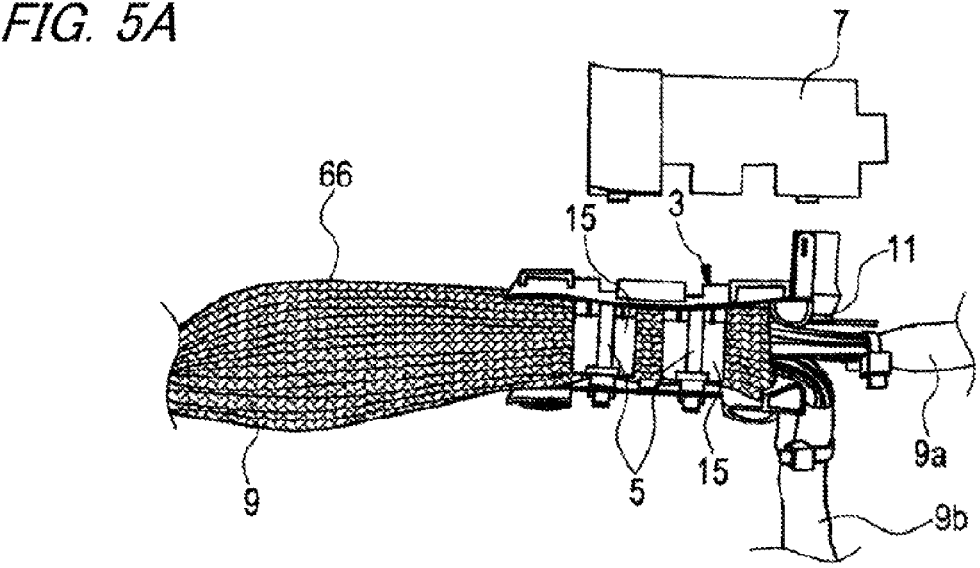
FIG. 5A is a perspective view showing a state where the protector body of the first embodiment is attached to a wire harness.
Figure 5B:
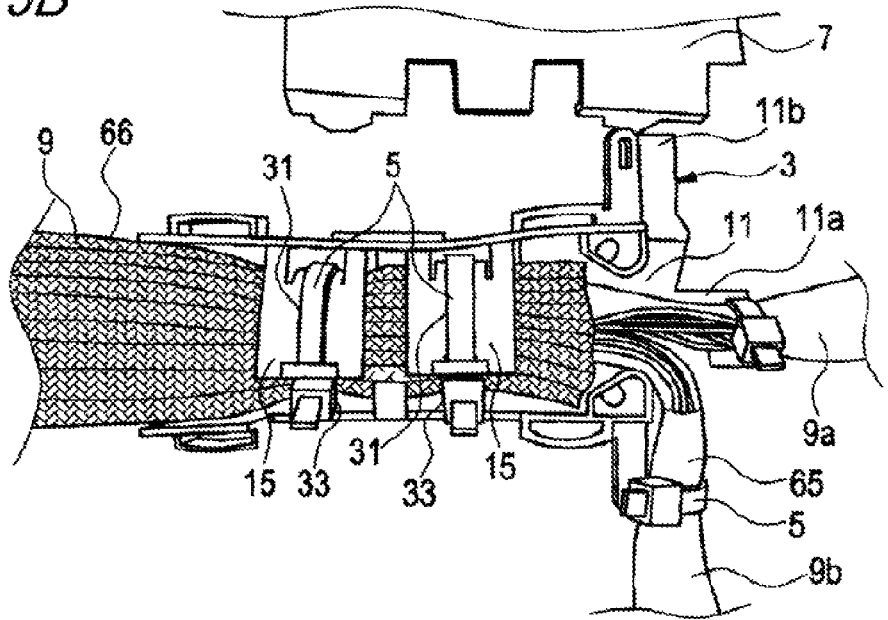
FIG. 5B is an enlarged view of FIG. 5A

The respective extension sections 11a, 11b, 11c are parts for supporting branched harnesses 9a, 9b (refer to FIGS. 5A to 5C) of the wire harness 9. The respective extension sections 11a, 11b, 11c are also formed at one sides thereof with band insertion-penetration holes 17. The band insertion-penetration holes 17 formed at one sides of the respective extension sections 11a, 11b, 11c are provided to tie and anchor the branched harnesses, which are branched on the respective extension sections 11a, 11b, 11c, to the respective extension sections 11a, 11b, 11c by the tying bands 5, as shown in FIGS. 5A and 5B.

In this embodiment, the side-plate section 12 standing from one side of the bottom-plate section 11 is provided to continue over a substantially whole length of the bottom-plate section 11 in the longitudinal direction (an arrow Y1 direction in FIG. 2), as shown in FIG. 1. However, the side-plate section 13 standing from the other side of the bottom-plate section 11 is intermittently provided along the longitudinal direction of the bottom-plate section 11. That is, as shown in FIGS. 1A and 1B, the other side of the bottom-plate section 11 is formed with side-plate deficiency sections 18 in which the side-plate section 13 does not exist. The side-plate deficiency sections 18 are used as window sections through which the branched wires of the accommodated wire harness 9 are pulled out.

Also, in this embodiment, the protector body 3 has cover latching sections 19 that are provided at both outer sides of the bottom-plate section 11 and are provided to detachably latch the protector cover 7.

Figure 3:
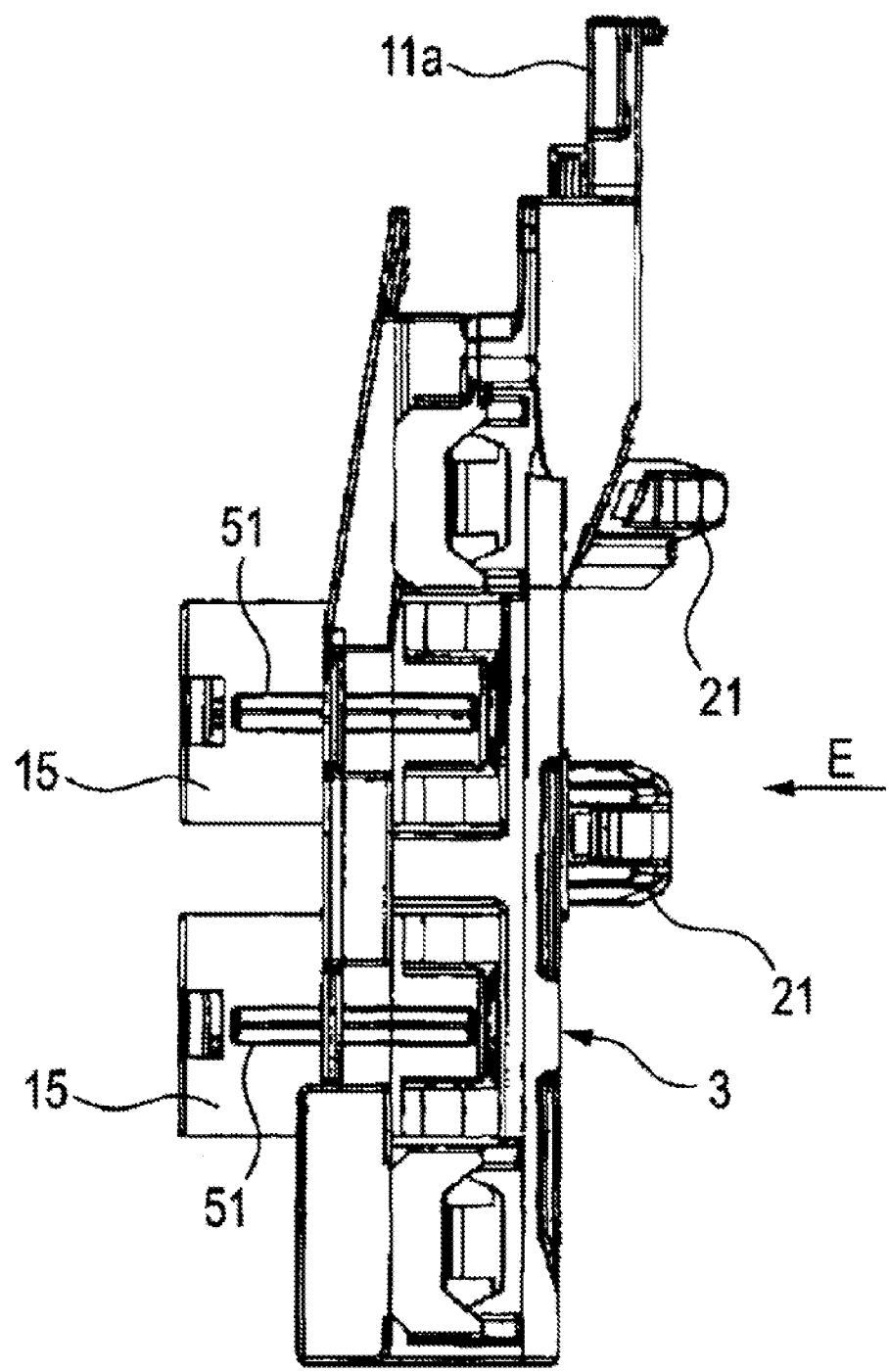
FIG. 3 is a view shown from an arrow D direction of FIG. 2.
Figure 4:
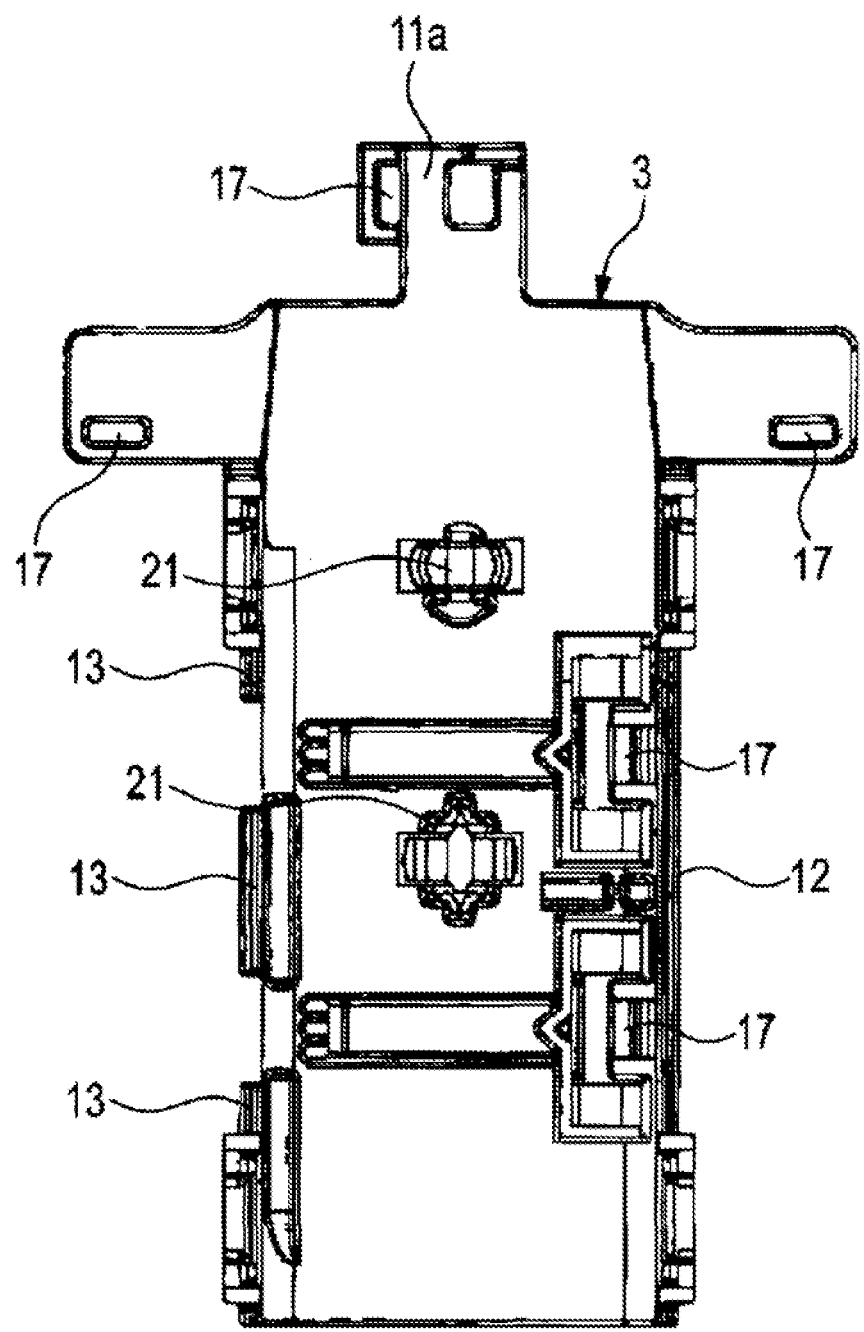
FIG. 4 is a view shown from an arrow E direction of FIG. 3.
Figure 11:
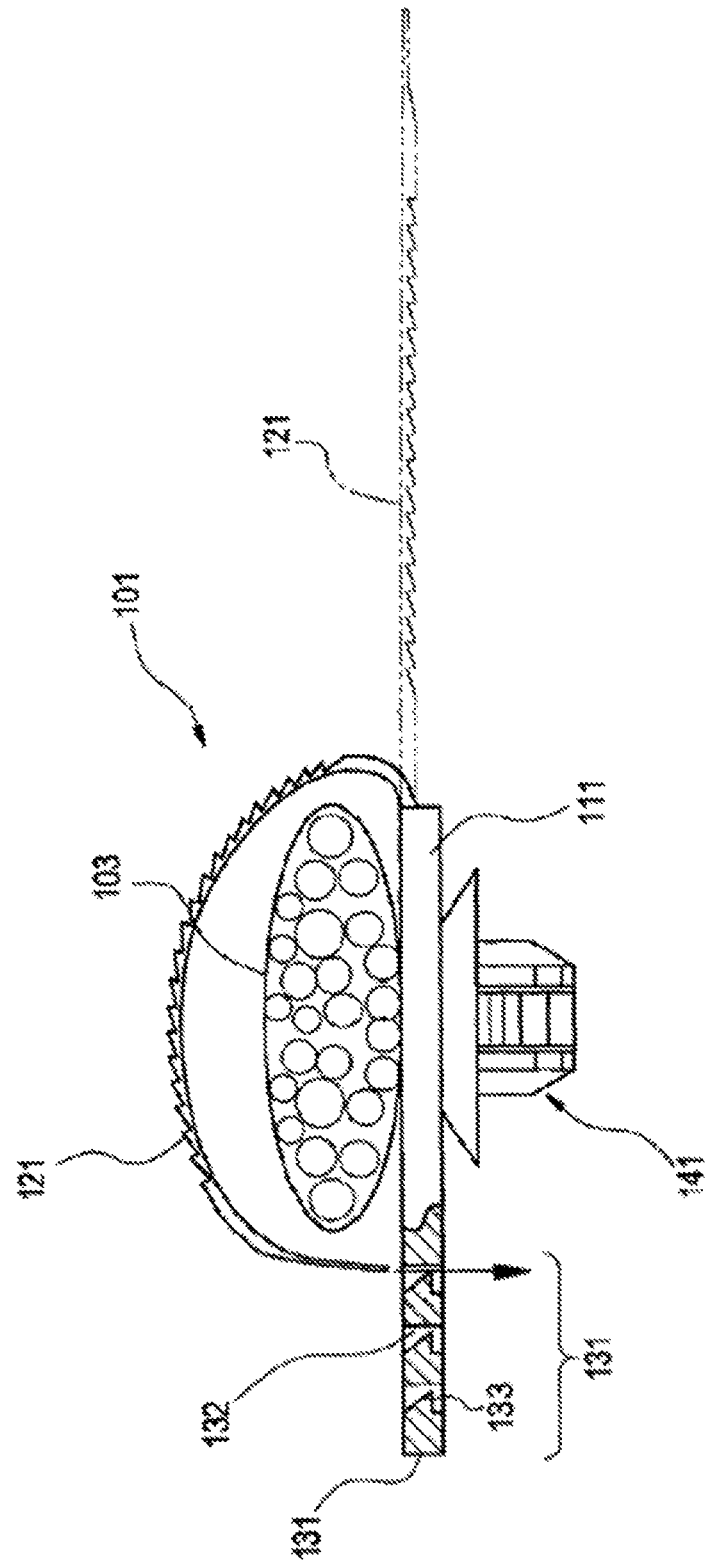
FIG. 11 is a side view showing an operation of winding a tying band section onto a wire harness placed on the placing plate section of the band clamp for wire harness shown in FIG. 9.
Figure 12:
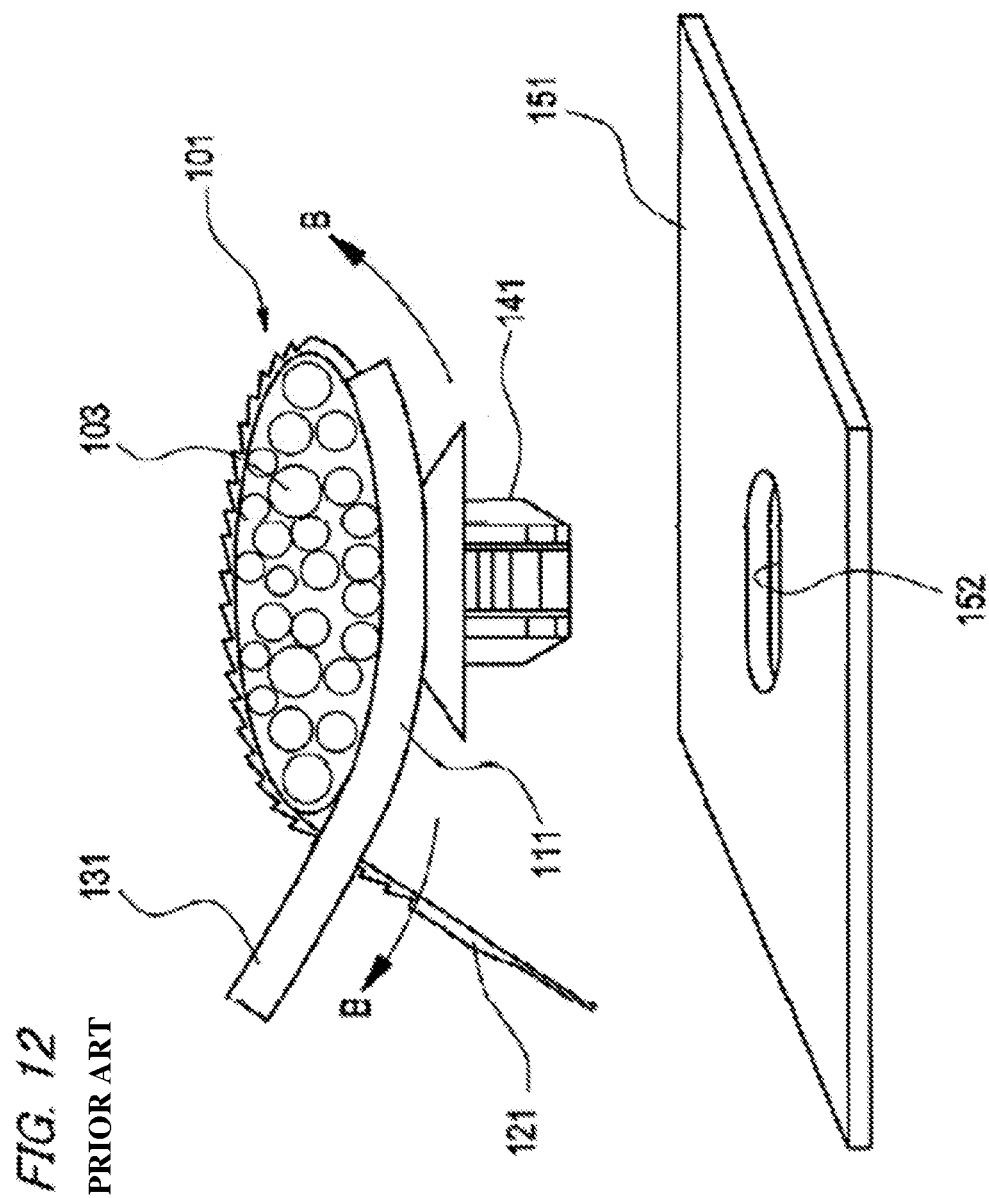
FIG. 12 is a side view showing a state where the tying band section is tightened in the band clamp for wire harness shown in FIG. 9.

Also, as shown in FIGS. 3 and 4, clip sections 21 protrude from an outer surface of the bottom-plate section 11 of the protector body 3. The clip section 21 is a member serving as the anchoring section that is fitted into an attaching hole of a structure on a wiring path of the wire harness 9 and thus connects the protector body 3 to the structure, and may have the same configuration as the dip section 141 shown in FIG. 11.

The tying bands 5 shown in FIGS. 5A and 5B are separately provided from the protector body 3 or protector cover 7. The tying band 5 has a band body 31 that can be inserted into the band insertion-penetration hole 17 of the protector body 3 and a band latching section 33 that is integrally formed with one end of the band body 31.

One surface of the band body 31 is formed with a plurality of engaging recesses at a predetermined interval in the longitudinal direction of the band body 31. Also, the band latching section 33 has an insertion-penetration hole into which the band body 31 is inserted and a latching claw that is provided in the vicinity of the insertion-penetration hole and is engaged with the engaging recess on the band body 31 to thus latch movement of the inserted band body 31 in a return direction.

As shown in FIGS. 5A and 5B, the tying bands 5 tighten the outer periphery of the protector body 3 to thus anchor the holding plate sections 15 to the bottom-plate section 11 at a state where the tying bands are inserted into the band insertion-penetration holes 17 provided to correspond to the provision positions of the holding plate sections 15 and the holding plate sections 15 crush the wire harness 9 into the oblate cross section.

As shown in FIG. 1B, the protector cover 7 has a cover body 61 that covers an opening section of the protector body 3 and elastic latching pieces 63 that extend from the cover body 61 and can be engaged with the cover latching sections 19 of the protector body 3. The protector cover 7 is detachably engaged with the protector body 3 and covers the opening section of the protector body 3 to thus protect the wire harness 9 accommodated in the harness protector 1.

As shown in FIGS. 5A to 7B, the wire harness 9 has a configuration where a plurality of wires 65 are accommodated in a net-shaped protection tube 66.

Figure 5C:
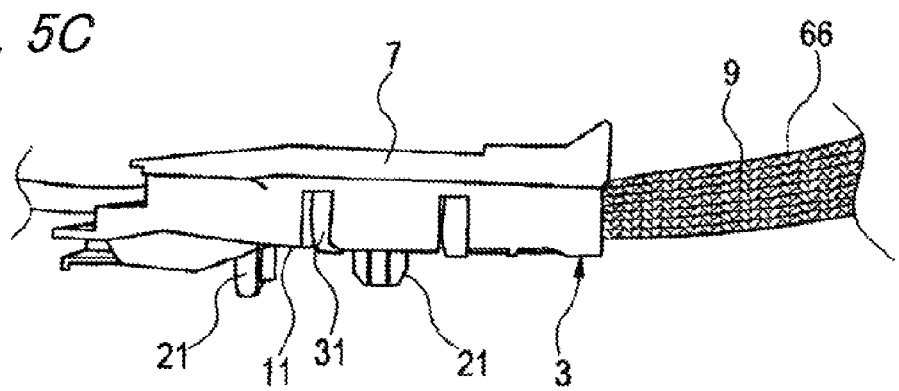
FIG. 5C is a side view of the harness protector of the first embodiment that is attached to the wire harness.

According to the harness protector 1 of the first embodiment as described above, the wire harness 9 is first inserted into the protector body 3 with the protector cover 7 being detached. Subsequently, as shown in FIGS. 5B and 5C, the respective holding plate sections 15 are put on the wire harness 9 accommodated in the protector body 3. Then, the holding plate sections 15 are pushed toward the bottom-plate section 11 to thus crush the wire harness 9 into the oblate cross section. Then, the respective holding plate sections 15 are anchored by the tying bands 5. After the anchoring of the respective holding plate sections 15 by the tying bands 5 is completed, when the protector cover 7 is mounted to the protector body 3, as shown in FIG. 5C, the mounting of the harness protector 1 to the wire harness 9 is completed.

When the harness protector 1 attached to the wire harness 9 is anchored to a structure such as vehicle body through the clip sections 21 integrally provided on the outer surface of the protector body 3, the anchoring of the wire harness 9 to the structure is completed.

According to the harness protector 1 of the first embodiment as described above, since the wire harness 9 to be maintained is anchored with being interposed and crushed between the substantially tubular-shaped bottom-plate section 11 and the holding plate sections 15, it is possible to easily form the wire harness 9 into the planar shape (with an oblate cross section) and to maintain the same in that state. In the vicinity of the anchored part by the harness protector 1, as the wire harness 9 is made to be planar, it is possible to easily bend the wire harness 9 with a small bending radius. Therefore, it is possible to improve the wiring operability of the wire harness 9 and to save the space of the wiring region.

Also, according to the harness protector 1 of the first embodiment as described above, the protector body 3 has a U-shaped cross section by the bottom-plate section 11 and the pair of side-plate sections 12, 13 at both sides of the bottom-plate section 11. When the wire harness 9 is placed on the bottom-plate section 11, the pair of the side-plate sections 12, 13 at both sides of the bottom-plate section 11 restrains the movement of the wire harness in a width direction. Therefore, it is possible to easily anchor the wire harness 9 to the harness protector 1, thereby improving the wiring operability.

Also, according to the harness protector 1 of the first embodiment as described above, the protector cover 7 that covers the opening section of the protector body 3 is provided. Therefore, it is possible to suppress the wire harness 9 from being exposed on the harness protector 1, thereby improving the protective effect on the wire harness 9.

Also, according to the harness protector 1 of the first embodiment as described above, at the state where the wire harness 9 is held by the holding plate sections 15 and the bottom-plate section 11, the first movement restraint projections 51 provided to the holding plate sections 15 and the second movement restraint projections 53 provided to the bottom-plate section 11 break into the surface of the wire harness 9, thereby restraining the axial movement of the wire harness 9.

Therefore, compared to the conventional band clamp in which the surface contacting the wire harness 9 is planar, it is possible to anchor the wire harness 9 more firmly. Hence, the invention can be also appropriately applied to anchor the wire harness 9 at a place where the axial load is applied to the wire harness 9.

In the below, a wire-harness wiring structure using the harness protector 1 of the first embodiment is described.

FIGS. 6A to 7B show a state where the harness protector 1 is used to anchor the wire harness 9 on a structure of a vehicle.

In FIGS. 6A to 7B, a reference numeral 83 indicates a seatback structure serving as a first structure configuring a reclining seat of a vehicle, a reference numeral 84 indicates a seat structure serving as a second structure configuring the reclining seat and a reference numeral 81 indicates a connection shaft serving as a moveable connection section that rotatably connects a lower end side of the seatback structure 83 to a rear end portion of the seat structure 84.

In FIGS. 6A to 7B, the wire harness 9 is arranged between the seatback structure 83 and the seat structure 84, which are the two structures, over the connection shaft 81 that is the moveable connection section. The harness protector 1 of the first embodiment mounted to the wire harness 9 is used as a means for anchoring the wire harness 9 to the seatback structure 83 that is the first structure in the vicinity of the connection shaft 81.

Figure 6A:
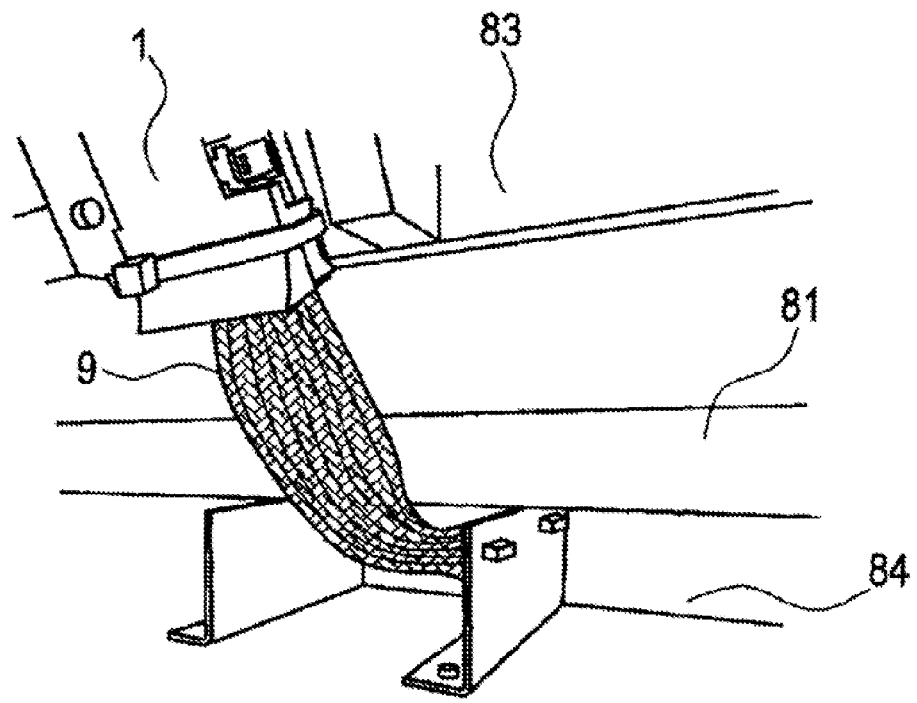
FIG. 6A is a perspective view of a wire-harness wiring structure in which a wire harness to be arranged over a moveable connection section of a reclining seat of a vehicle is anchored to a seatback structure (a second structure) by the harness protector of the first embodiment and FIG. 6B is a perspective view showing a state where a plurality of wires configuring the wire harness is exposed by removing a flexible protection tube of the wire harness of FIG. 6A.
Figure 6B:
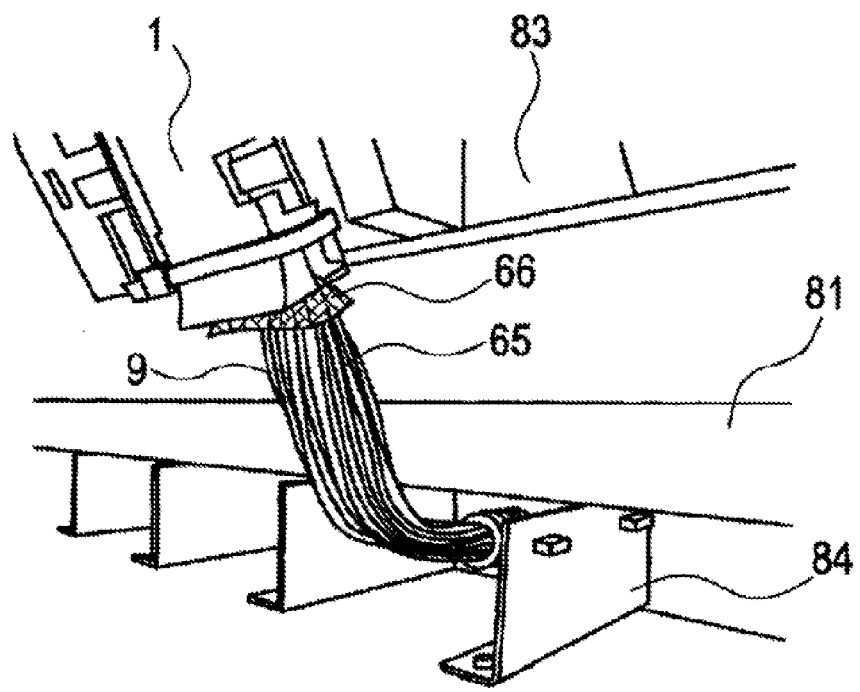
Figure 7A:
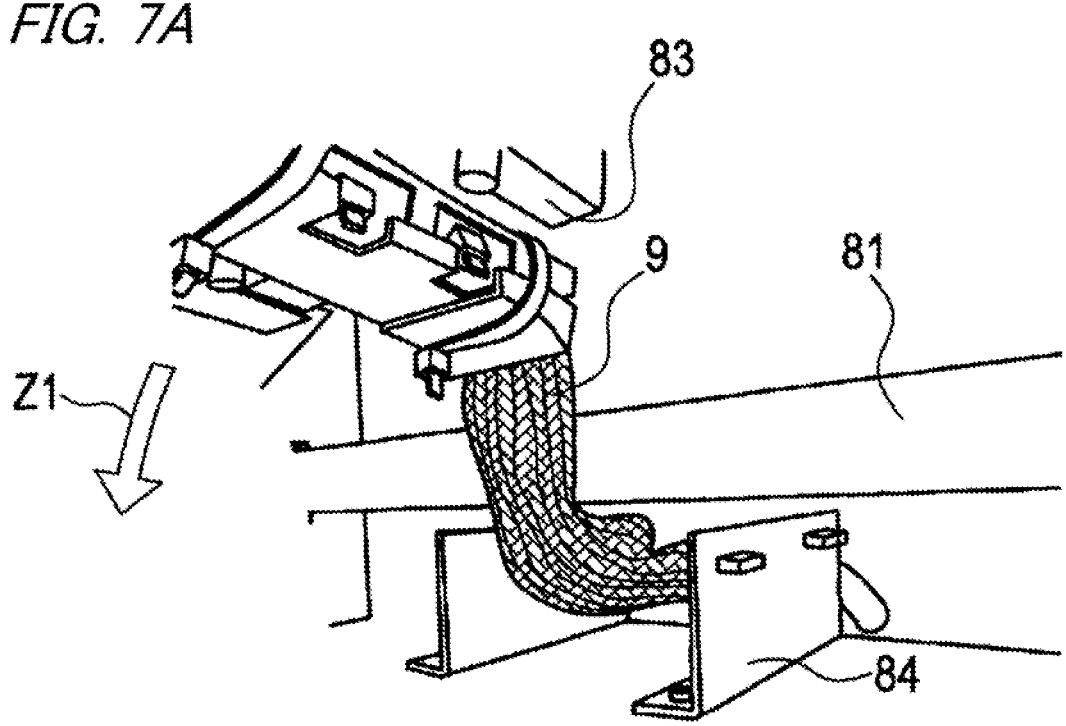
FIG. 7A is a perspective view showing a state where the seatback structure shown in FIG. 6A is reclined and FIG. 7B is a perspective view showing a state where a plurality of wires configuring the wire harness is exposed by removing a flexible protection tube of the wire harness of FIG. 7A.
Figure 7B:
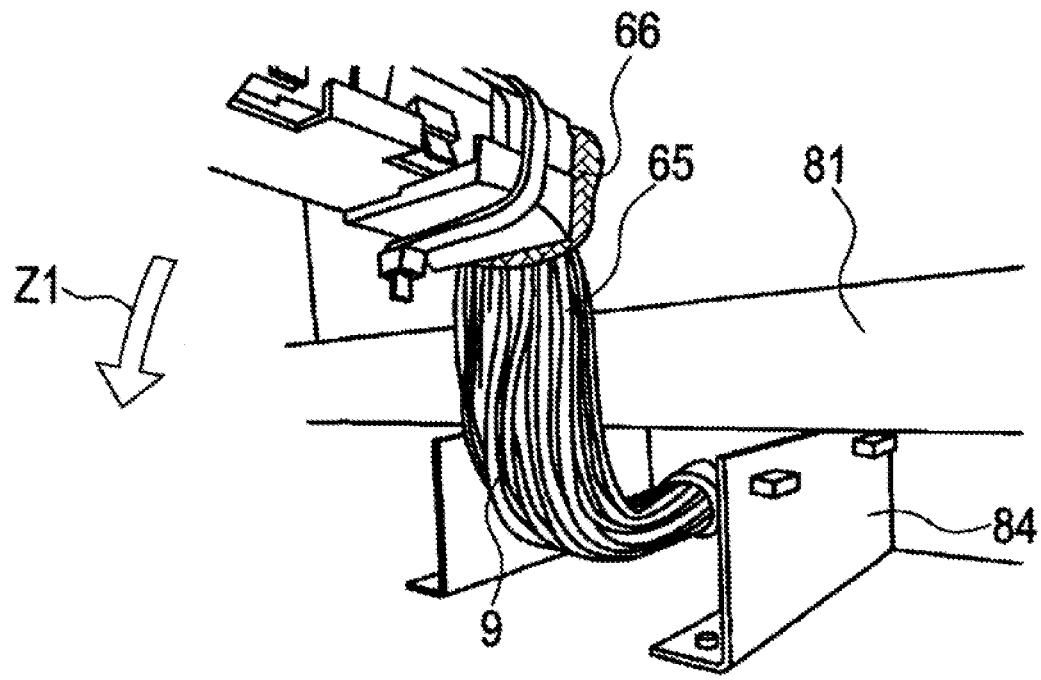
Figure 9:
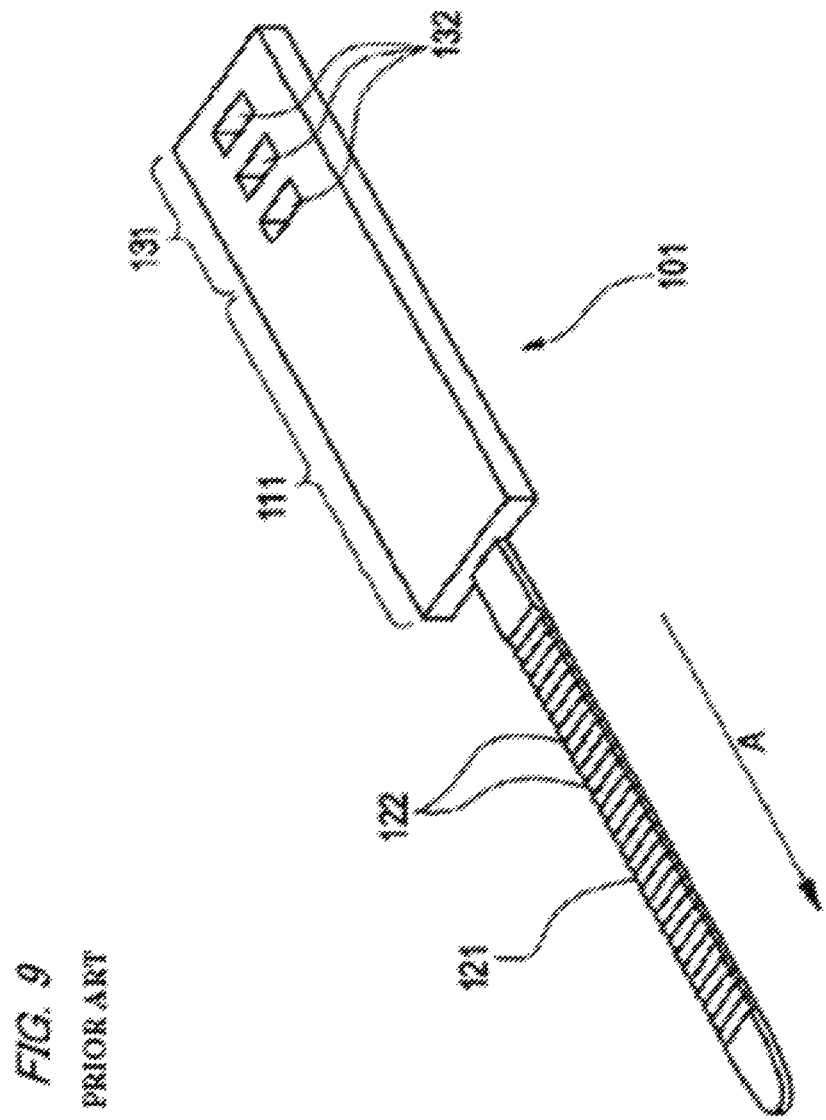
FIG. 9 is a perspective view of a band clamp for wire harness according to the prior art.
Figure 10:
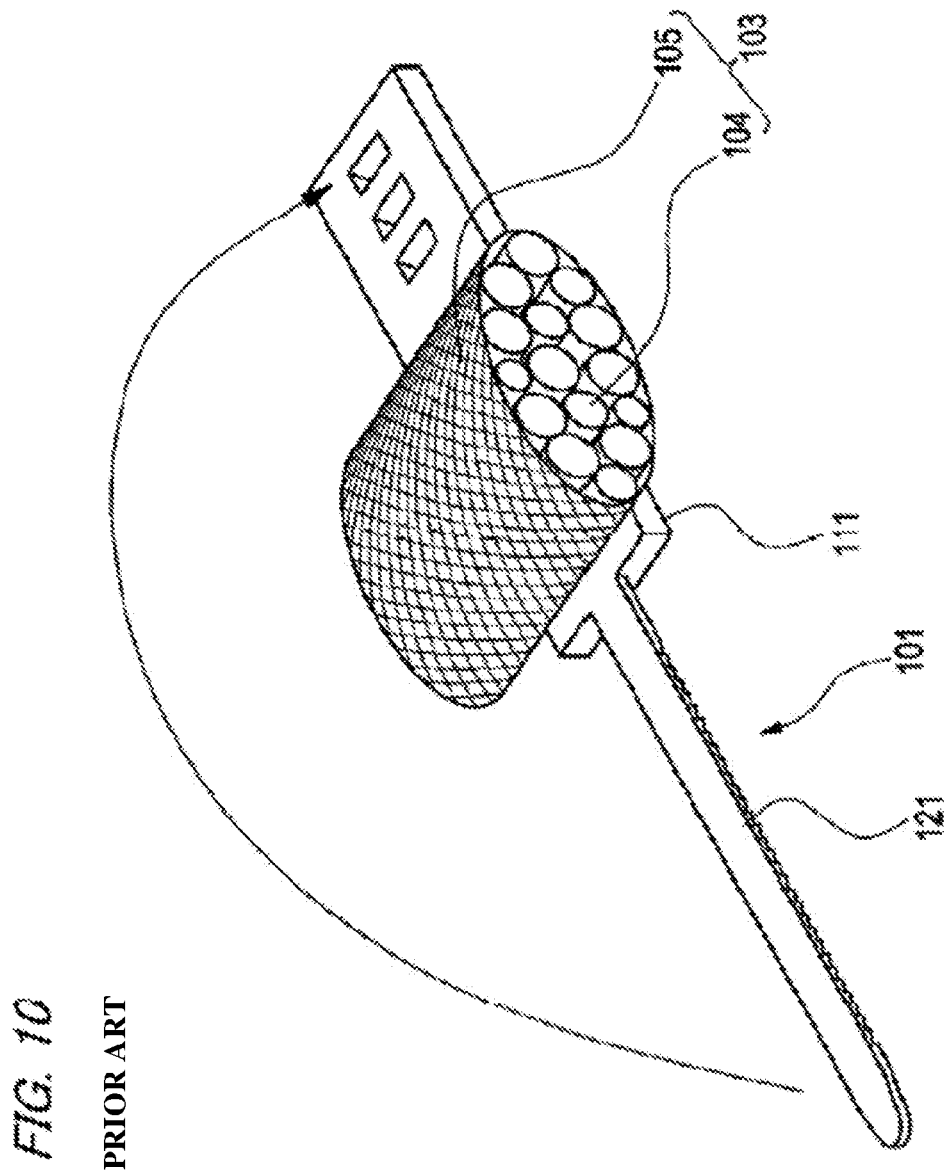
FIG. 10 is a perspective view showing a state where a wire harness is placed on a placing plate section of the band clamp for wire harness shown in FIG. 9.

In the meantime, FIGS. 7A and 7B show a state (a state where the seatback structure is rotated in an arrow Z1 direction of FIGS. 7A and 7B) where the seatback structure 83 is inclined rearward from the state shown in FIGS. 6A and 6B.

In the wire-harness wiring structure shown in FIGS. 6A to 7B, the wire harness 9 extending over the connection shaft 81 that is the moveable connection section is made to be planar by the harness protector 1 that is anchored to the seatback structure 83 in the vicinity of the wire harness. Therefore, it is possible to easily bend the wire harness with a small bending radius, so that it is possible to save a space of the wiring region of the wire harness 9 and to improve the wiring operability in the vicinity of the connection shaft 81. Thus, the wire-harness wiring structure that is appropriate for the wire harness 9 to be arranged over the connection shaft 81 is obtained.

Second Embodiment

FIGS. 8A and 8B show a second embodiment of the harness protector of the invention.

A harness protector 1A of the second embodiment is improvements on a part of the harness protector 1 of the first embodiment. The main improvements are as follows. A width of the bottom-plate section 11 of the protector body 3 is widened so as to maintain the wire harness 9 as a wider planar cable. Also, as the width of the bottom-plate section 11 is widened, a length of the holding plate section 15 integrally formed with the protector body 3 is increased. Also, the respective extension sections 11b, 11c provided at one end of the bottom-plate section 11 have a trough shape capable of stably holding the branched harnesses. The lengths of the respective extension sections 11a, 11b, 11c are also increased, compared to the first embodiment. Also, each of the extension sections 11a, 11b, 11c is provided at an end portion with a protruding step 11d for retaining. The steps 11d are provided to prevent the tying bands 5 wound onto the outer peripheries of the respective extension sections 11a, 11b, 11c from getting removed. As the steps 11d are provided, the respective extension sections 11a, 11b, 11c are not formed with the band insertion-penetration holes 17.

Meanwhile, in the harness protector 1A of the second embodiment, the configurations common or equivalent to those of the first embodiment are indicated with the reference numerals common to the harness protector 1 of the first embodiment and the descriptions thereof are omitted.

In the harness protector 1A of the second embodiment, the width is set to be wider than the harness protector 1 of the first embodiment. Thus, it is possible to form and maintain the wire harness 9 having a larger diameter into a more planar shape.

Also, as the extending lengths of the respective extension sections 11a, 11b, 11c are increased, the branched harnesses are stably anchored to the respective extension sections 11a, 11b, 11c.

Also, the respective extension sections 11a, 11b, 11c are not formed with the band insertion-penetration holes 17. Hence, it is possible to simplify the structure of the respective extension sections 11a, 11b, 11c.

In the meantime, although the harness protector of the invention has been described with reference to the specific embodiments, the invention is not limited to the above embodiments and appropriate modifications and improvements can be made. Also, the materials, shapes, sizes, forms, the number, the arranging places and the like of the respective constitutional elements of the harness protector of the invention are arbitrary insomuch as the object of the invention can be achieved, and are not limited to the above embodiments.

For example, in the above embodiments, the movement restraint projections for restraining the axial movement of the wire harness are provided to both the holing plate sections and the bottom-plate section. However, when the axial load that is applied to the wire harness to be maintained is not high so much, the movement restraint projections may be provided to only one of the holing plate sections and the bottom-plate section.

This application is based on Japanese Patent Application No. 2010-165249 filed on Jul. 22, 2010, the disclosures of which are incorporated herein by reference.

INDUSTRIAL APPLICABILITY

According to the harness protector of the invention, since the wire harness to be maintained is crushed with being interposed between the substantially tubular-shaped bottom-plate section and the holding plate sections, it is possible to easily form and maintain the wire harness into the planar shape (with an oblate cross section). Therefore, it is possible to improve the wiring operability of the wire harness and to save the space of the wiring region.

REFERENCE SIGNS LIST 1, 1A: harness protector
3: protector body
5: tying band
7: protector cover
9: wire harness
11: bottom-plate section
11a, 11b, 11c: extension section
11d: step
15: holding plate section
16: thin hinge section
17: band insertion-penetration hole
21: clip section (anchoring section)
51: first movement restraint projection
53: second movement restraint projection

The invention claimed is:
1. A harness protector comprising:
a protector body comprising a substantially planar-shaped bottom-plate section on which a wire harness is placed and a substantially planar-shaped holding plate section that is integrally and rotatably formed on a first side of the bottom-plate section and extends to a second opposite side thereof and crushes the wire harness into an oblate cross-section shape with the wire harness being interposed between the holding plate section and the bottom-plate section;
a tying band which extends from the first side of the bottom-plate section to the second side thereof and along a top surface of the holding plate section to anchor the holding plate section onto the bottom-plate section in a state where the holding plate section crushes the wire harness into the oblate cross-section shape by shifting relative positions of electric wires of the wire harness; and
extension sections configured to lead branched wires of the wire harness from the protector body at a plurality of orthogonal angles to a longitudinal axis of the protector body, wherein
the extension sections are orthogonal to the longitudinal axis of the protector body, and
the longitudinal axis extending substantially parallel to a longest side of the protector body,
wherein the tying band extends from the first side to the second side in a direction perpendicular to the longitudinal axis and covers an entire width of the wire harness in the protector body, and wherein the harness protector is used as a means for anchoring the wire harness to the structures in the vicinity of a moveable connection section, the harness protector further comprising:
- an anchoring section that protrudes from an outer surface of the protector body and is fitted into an attaching hole of a structure on a wiring path of the wire harness, thereby connecting the protector body to the structure;
- a protector cover that is detachably engaged with the protector body and covers an opening section of the protector body; and
- side-plate deficiency sections for leading branched wires of the wire harness through respective side-plate sections, wherein the protector body comprises a pair of side-plate sections that is provided to stand at both sides of the bottom-plate section, and the holding plate section is integrally and rotatably formed with one of the pair of side-plate sections, and wherein the side-plate deficiency sections are provided other than at an end of the protector body in the longitudinal direction at which the extension sections are provided.

2. The harness protector according to claim 1, wherein the holding plate section is provided with a first movement restraint projection configured to press into a contacting surface of the wire harness to thus restrain axial movement of the wire harness.

3. The harness protector according to claim 1, wherein the bottom-plate section is provided with a second movement restraint projection configured to press into a contacting surface of the wire harness to thus restrain axial movement of the wire harness.

4. A wire-harness wiring structure that arranges a wire harness between two structures over the moveable connection section moveably connecting the two structures, wherein the harness protector according to claim 1 is used as the means for anchoring the wire harness to the structures in the vicinity of the moveable connection section.

5. The harness protector according to claim 1, wherein the tying band is wound around an outside of the protector body.

6. The harness protector according to claim 1, wherein the extension sections extend from the bottom-plate section and formed in a trough shape so as to hold a plurality of branched wires which are branched from the wire harness.

7. The harness protector according to claim 1, wherein the extension sections branch from an end of the protector body along the longitudinal axis.

8. The harness protector according to claim 7, wherein another extension section branches from the end of the protector body and is configured to lead a plurality of wires of the wire harness from the end of the protector body in a direction parallel to the longitudinal axis.

9. The harness protector according to claim 1, wherein a second holding plate section is provided on the protector body and spaced from the holding plate section along the longitudinal axis.

* * * * *